Sept. 17, 1929. J. G. KING Re. 17,434

REFRIGERATING APPARATUS

Original Filed Sept. 26, 1923

Inventor
Jesse G. King.
By F. Ralph Fiehr
His Attorney

Reissued Sept. 17, 1929

Re. 17,434

UNITED STATES PATENT OFFICE.

JESSE G. KING, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Original No. 1,588,379, dated June 8, 1926, Serial No. 664,810, filed September 26, 1923. Application for reissue filed September 30, 1927. Serial No. 223,197.

This invention relates to refrigerating apparatus and particularly to devices for freezing small blocks of ice in household refrigerating cabinets.

In refrigerating apparatus of this type it is usual to provide a freezing space or chamber having one or more openings through which trays containing water to be frozen may be inserted in the chamber. These trays are usually in the form of relatively shallow open-top pans divided into a plurality of cells or ice compartments by crossed partitions giving a grid-like or checker-board appearance to the pans when viewed from above. Each tray is usually covered, when in the freezing chamber, by a shield, forming a part of the evaporator, which prevents water from dripping into the trays, for example when the evaporator is defrosted. These shields are preferably, but not necessarily, in the form of sleeves completely surrounding the trays and forming pockets within which the trays are placed. The sleeves or pockets referred to may be surrounded by refrigerant circulating conduits forming a part of the evaporator, or immersed in brine, or cooled by the evaporator in any suitable manner. The front of the freezing space or chamber may be closed by a wall in which the openings referred to are formed, and this wall may or may not be spaced from the shields.

In operation water is apt to condense on and run down the wall, and defrosting water is apt to drip from the front edges of the shields or sleeves, and thus get into the trays. It is one of the objects of this invention to prevent this condensed water from entering the ice pans, since it may contaminate the ice, or overflow and freeze the pan to the sleeve.

In case the ice pan freezes to the sleeve by reason of the cells having received so much water that it overflows when congelation begins, or if for any other reason ice is formed within the sleeve in such position as to obstruct the withdrawal of the ice tray, breakage of the tray handle connections to the pan is apt to occur when an attempt is made to withdraw the tray in order to harvest the ice. Another object of this invention is to enable broken connections occurring as described to be readily repaired.

Figure 1:
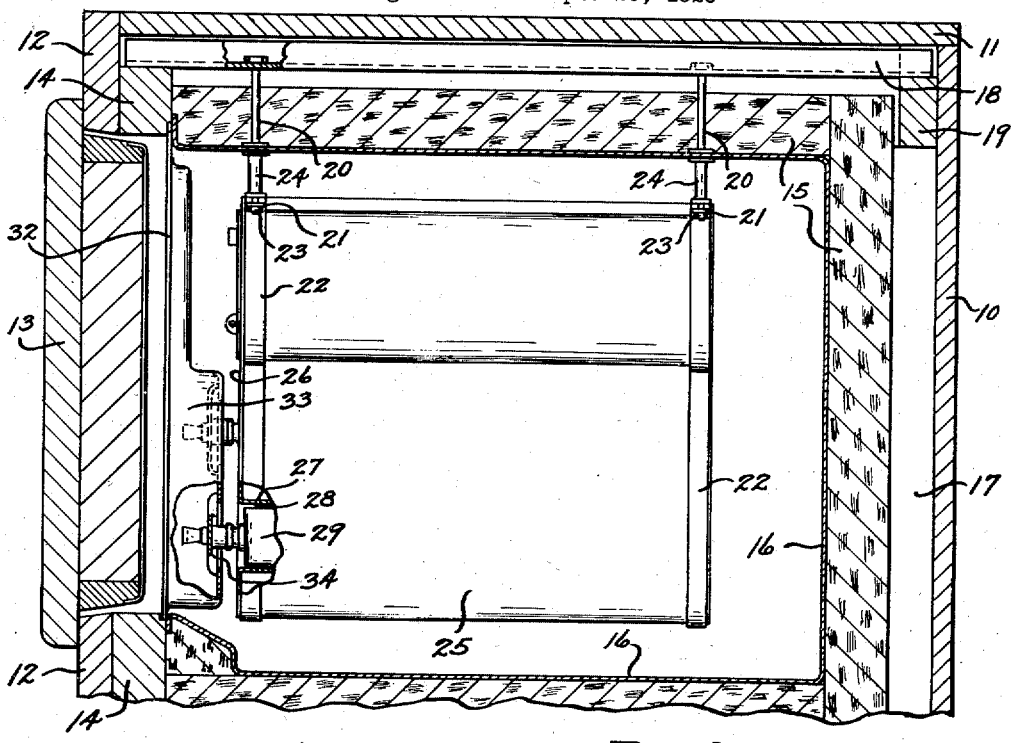
Figure 2:
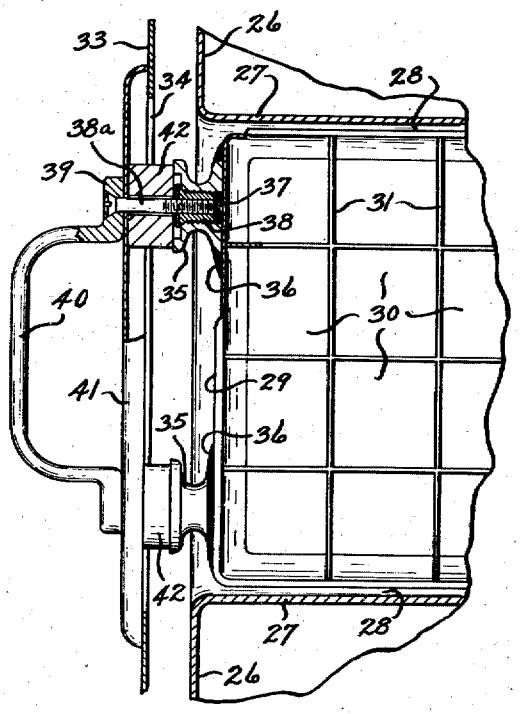

In the accompanying drawings, Fig. 1 is a vertical section through the refrigerating compartment of a refrigerator cabinet exposing the refrigerating unit in side elevation, certain portions having been broken away to disclose the construction of essential features of this invention; and Fig. 2 is a horizontal section through a fragment of a brine tank, and a cover plate, disclosing a fragment of an ice tray in plan except that parts thereof are broken away.

In Fig. 1 the back of the outer shell or casing of a refrigerating cabinet is indicated by 10, the top of said shell or casing by 11, the front by 12, and the door of the refrigerating compartment by 13. The front frame structure is shown at 14; 15 indicates cork board insulation cemented to the sheet metal lining 16 of the compartment and spaced from the casing to form an air space 17; 18 is a channel bar, (for which there are in practice two) supported by the upper cross member of front frame 14 and a cross cleat 19 on the casing back. Said channel bars sustain the bolts 20 which extend downward through holes in the web of the channel and are suspended by their heads from said web. These bolts penetrate the cork insulation and the compartment lining; their lower threaded ends are passed through ears 21 on metallic straps or stirrups 22, which are suspended by nuts 23 on the ends of the bolts below said ears, while spacing sleeves 24 on the bolts between the stirrups and the ceiling of the compartment prevent any upward movement. The suspended stirrups constitute a cradle or bracket for positioning the refrigerating unit in the refrigerating compartment with ample space for permitting air to circulate around it.

In the embodiment illustrated a brine tank is indicated by numeral 25. Within the brine tank, it will be understood, the usual expansion coil is enclosed. The front wall of the brine tank is indicated at 26. Extending inwardly and rearwardly from the front wall are sleeves or tubular bodies 27 forming pockets 28 for the ice trays. These pockets have open front ends and are immersed in brine.

Ice trays having a relatively shallow pan 29 fit loosely within the pockets 28. The pans are divided into a number of ice compartments 30 by the grid-like intersecting partitions 31. Spaced from the front of the brine tank between it and the door 13, is a front plate 32 forming the front wall of the freezing chamber and preventing access to the interior of the chamber except to enable the ice trays to be inserted and removed. The front plate may be of metal coated with a porcelain or vitreous enamel, and suitably embossed as at 33 in that part that is opposite the open ends of the pockets 28. In the embossed part 33 are orifices 34 registering with the open ends of pockets 28 and sufficiently large to permit the trays 29 to be passed through them into the pockets 28 or withdrawn from said pockets through the openings.

Soldered or welded to the front end of each ice pan are two bosses 35, which are thus secured to the pan in such manner that no obstruction is present on the inside to interfere with removal of ice. The bosses 35 are preferably of metal and may be of spool-like formation having their inner flanged ends secured to the tray by a mass of soldering or welding metal as indicated at 36. Both bosses are drilled and countersunk and the drilled holes threaded as at 37. A flanged tubular anchor bolt 38 with a slotted head seated in the countersink is threaded into the hole in each boss and a slender, flat-headed machine screw 38ª is threaded into the center of each anchor bolt. The screws 38ª pass through countersunk holes in the flanges 39 of a looped handle 40, through a stop and cover plate 41 and through a separate spacer block 42, preferably of heat insulating material such as wood, inserted between the metallic stop and cover plate 41 and the metallic boss 35. The stop and cover plate 41 is preferably dished, as shown, and its flange bears upon the front 33 when the tray is pushed into the sleeve. It is of a size and shape to cover the opening 34, preferably has the appearance of a drawer or tray front and serves not only to close the opening but also as a stop and gauge to determine the position of the ice pan with respect to the pocket and the front wall 33.

Since the screws 38ª are slender, they are of small heat conducting capacity, and since the spacers 42 are of insulating material, the whole fastening means can conduct very little heat from the handle 40 and tray front 41 to the tray. Thus the handle and tray front will not ordinarily become frosted.

It will be observed that in the drawings the front end of the pan does not extend beyond, nor even flush with the front of the sleeve 27, but occupies a position well within the pocket 28. In the position shown condensed water or water formed by melting frost that may drip from the front of the sleeve will not run into the ice pan, but will drip across the space in front thereof. The bosses 35 and spacing blocks 42 are of such length as to space the front of the ice pan from the stop plate 41 such a distance that when the stop plate engages the front 33, the ice pan will be housed entirely within the pocket. Moreover the bosses and spacing blocks are so shaped and so located with respect to the sleeve 27 that any condensed water which may happen to drip upon them will immediately drain off and can neither flow into the pan nor lodge between the spacing means and sleeve. This preventing of lodgment between the spacing means and sleeve effectively prevents freezing of the pan to the sleeve through the freezing of any condensed water. In building refrigerator cabinets and installing the refrigerating unit it is likely to happen that the space between the front plate 33 and the front of the brine tank will not always be the same in each of several pieces of apparatus. By spacing said stop plates 41 from the front of the ice trays a distance greater than the distance between the front plate 33 and the front 26 of the brine tank that is likely to exist in any refrigerator, the result will be that the front end of the ice pans will always be well within the pockets 28, in any installation of one type when the stop plate 41 is pushed against the front plate 33. Thus, by no untoward accident in the course of manufacture will any refrigerating apparatus of the same type have the ice pan in position to receive the drip of condensed water or melted frost from the edges of the sleeves or from the front wall of the brine tank when the handle is pushed in.

Although in Fig. 1 the invention is illustrated as applied to a refrigerating unit equipped with a brine tank, it will be obvious, that it is also applicable to such a unit where the expanding coil is open, or not immersed in brine. The numeral 26 in Fig. 2 may be assumed to indicate a cover plate in the latter type of unit instead of the front wall of a brine tank, and the sleeve or tubular member 27 as extending rearward within the turns of the expansion coil.

In operation the cells or compartments 30 of the ice pan will be charged with water and the tray pushed into place with the pan seated within pocket 28. After the water has frozen, the tray may be withdrawn and the ice or so much as may be required removed from the pan. Should the tray be frozen to the walls of the pocket by reason of overflow of water from the pan or the freezing of water of condensation within the front opening of the pocket, it is possible that the bolts or screws 38, which are the weakest parts of the connecting links between the handle and the tray, may become broken by the force exerted in attempting to withdraw the tray. If so, they may be readily replaced after first unscrewing the anchor bolt 38 by means of a spanner. A new anchor bolt and machine screw may then be readily fitted, avoiding the necessity of sending the tray to the factory or to a repair shop as has been necessary where other forms of fastening have been used.

Although I have described and shown a preferred embodiment of my invention, it will be apparent that modifications thereof may be made within the definition of the appended claims without departing from the principles of the invention.

What I claim and desire to secure by Letters Patent of the United States is:

1. In a refrigerating apparatus, a refrigerating unit, a pocket-forming sleeve associated therewith, a tray for receiving water to be frozen adapted to fit within the sleeve, a front plate spaced from the entrance of the sleeve, said front plate having a tray-admitting opening registering with the sleeve, a handle connected to the tray and a stop secured to the handle for engaging the front plate when the tray is in proper position within the sleeve, the distance between the front plate engaging portion of the stop and the front of the tray being greater than the distance between the front plate and the front end of said sleeve.

2. In a refrigerating apparatus, a refrigerating unit, a pocket-forming sleeve associated therewith, a tray for receiving water to be frozen adapted to fit within the pocket, a front plate having a tray-admitting opening registering with the sleeve, a handle carried by said tray for moving the same into and for withdrawing the same from said sleeve, and a stop movable with said handle and tray and arranged to engage the front plate when the tray is in proper position within the sleeve, the distance between the front plate engaging portion of the stop and the front of the tray being greater than the distance between the front plate and the front end of said sleeve.

3. In a refrigerating apparatus, a refrigerating unit equipped with a pocket sleeve, an ice tray adapted to fit within the pocket, a boss secured to the front of the tray, a handle, a screw securing the handle to the boss, a separable heat insulating spacing block surrounding the screw interposed between the handle and boss, and a stop plate movable with said ice tray and engaging a fixed member to limit the entrance of said tray into said pocket.

4. In a refrigerating apparatus, a cabinet having a refrigerating compartment, a refrigerating unit equipped with a pocket-forming sleeve installed within said compartment, a front plate spaced from the front of said unit, said front plate having on opening registering with the front end of the sleeve; an ice tray adapted to fit within the sleeve, a handle, a boss on the front of the tray, an externally and internally threaded anchor bolt secured in the boss, a removable spacing block in contact with the boss, a stop plate between the boss and the handle, adapted to engage the front plate and a screw threaded into the anchor bolt and passing through said handle, stop plate and spacing block, the distance between the stop plate and front of the tray being greater than that between the front plate and the front end of the sleeve.

5. Refrigerating apparatus including in combination, a cooling device having a freezing chamber, the freezing chamber having an opening, an ice-making container adapted to be inserted in the chamber through the opening, and a closure for the opening secured to the container and spaced therefrom by isolated spacers of insulating material.

6. Refrigerating apparatus including in combination, a cooling device having a freezing chamber, the freezing chamber having an opening, an ice-making container adapted to be inserted in the chamber through the opening, and a closure for the opening secured to the container, said closure acting as a stop to position the container in the chamber with said end away from the opening.

7. Refrigerating apparatus including in combination, a freezing chamber having a wall, said wall having an opening, an ice-making container adapted to be inserted in the chamber through said opening, a stop secured to the container and spaced from one end thereof, and adapted to cooperate with the wall to position the container in the chamber with its adjacent end away from the wall.

8. Refrigerating apparatus including means providing a freezing space and a shield, an ice-making container adapted to be placed in the freezing space beneath the shield, the container being shorter than the shield, and means projecting from one end of the container by which it may be placed in and withdrawn from the freezing space, said means including a stop spaced from said end of the container, said refrigerating apparatus including an abutment for cooperating with the stop for positioning said end of the container between the ends of the shield when the container is placed in the freezing space.

9. Refrigerating apparatus including means providing a freezing space and a sleeve for receiving an ice-making container, an ice-making container adapted to be placed in the sleeve, the container being shorter than the sleeve, and means projecting from one end of the container by which it may be placed in and withdrawn from the sleeve, said means including a stop spaced from said end of the container, said refrigerating apparatus including an abutment for cooperating with the stop to position said end of the container between the ends of the sleeve when the container is placed therein.

10. Refrigerating apparatus including means providing a freezing space and a shield, an ice-making container adapted to be placed in the freezing space beneath the shield, an ice-making container adapted to shield, a handle attached to the container and spaced from one end thereof, and a stop associated with the handle, said refrigerating apparatus including an abutment for cooperating with the stop to position the adjacent end of the container between the ends of the shield when the container is placed in the freezing space.

11. Refrigerating apparatus including in combination, a cooling device having a freezing chamber, the freezing chamber having an opening, an ice-making container adapted to be inserted in the chamber through the opening, a handle for the container, a skeleton structure connecting the handle to the container and spacing it from one end thereof, and a stop associated with the handle, said refrigerating apparatus including an abutment for cooperating with the stop to position the container in the chamber with said end away from the opening.

12. Refrigerating apparatus including in combination, a cooling device having a freezing chamber, the freezing chamber having an opening, an ice-making container adapted to be inserted in the chamber through the opening, a stop for the container, and a skeleton structure connecting the stop to the container and spacing it from one end thereof, said refrigerating apparatus including an abutment for cooperating with the stop to position the container in the chamber with said end away from the opening.

13. Refrigerating apparatus including in combination, a cooling device having a freezing chamber, the freezing chamber having an opening, an ice-making container adapted to be inserted in the chamber through the opening, a closure for the opening, and a skeleton structure connecting the closure to the container and spacing it therefrom.

14. Refrigerating apparatus including in combination a refrigerating element provided with a freezing chamber having an opening and a refrigerated surface exposed to air located above the freezing chamber, an ice-making container adapted to be inserted in the chamber through the opening, a stop for the container, means connecting the stop to the container and spacing the stop from one end thereof, said means being so formed as to permit the passage of condensed water from said surface between the stop and the container, and said refrigerating apparatus including an abutment for cooperating with the stop to position said end of the container within the freezing chamber remote from the opening.

15. Refrigerating apparatus including in combination a refrigerating element provided with a freezing chamber having an opening and a refrigerated surface exposed to air located above the freezing chamber, an ice-making container adapted to be inserted in the chamber through the opening, a stop for the container, means connecting the stop to the container and spacing the stop from one end thereof, said means being so formed and so located as to prevent lodgment of condensed water dripping from said surface onto said means, and said refrigerating apparatus including an abutment for cooperating with the stop to position said end of the container within the freezing chamber remote from the opening.

16. Refrigerating apparatus including in combination a cooling device provided with a freezing chamber having an opening and a refrigerated surface exposed to air located above the freezing chamber, an ice-making container adapted to be inserted in the chamber through the opening, a closure for the opening and means securing the closure to the container and spacing the closure therefrom, said means being so formed as to permit the passage of water from the refrigerated surface between the closure and the container.

17. Refrigerating apparatus including in combination a cooling device provided with a freezing chamber having an opening and a refrigerated surface exposed to air located above the freezing chamber, an ice-making container adapted to be inserted in the chamber through the opening, a closure for the opening, and means securing the closure to the container and spacing the closure therefrom, said means being so formed and so located as to prevent lodgment of condensed water dripping from the refrigerated surface between the closure and the container.

18. Refrigerating apparatus including in combination a refrigerating element provided with a freezing chamber having an opening and a refrigerated surface exposed to air located above the freezing chamber, an ice-making container adapted to be inserted in the chamber through the opening, a stop for the container, means connecting the stop to the container and spacing the stop from one end thereof, said means being so formed as to drain away from the container any water deposited on said means from said surface.

19. Refrigerating apparatus including in combination a refrigerating element provided with a freezing chamber having an opening and a refrigerated surface exposed to air located above the freezing chamber, an ice-making container adapted to be inserted in the chamber through the opening, a stop for the container, means connecting the stop to the container and spacing the stop from one end thereof, said means being so formed as to permit condensed water to drip freely between the stop and the container.

20. Refrigerating apparatus including in combination a refrigerating element provided with a freezing chamber and a refrigerated surface exposed to air located above the freezing chamber, a wall in front of the freezing chamber and said surface, the wall having an opening registering with said chamber, an ice-making container adapted to be inserted in the chamber through the opening, a closure for the opening in the wall, means connecting the closure to the container and spacing it from one end thereof, said means being so formed as to permit the drippage of water condensed on said surface between the wall and the container.

JESSE G. KING.

CERTIFICATE OF CORRECTION.

Reissue Patent No. 17,434. Granted September 17, 1929, to

JESSE G. KING.

It is hereby certified that error appears in the printed specification of the above numbered patent requiring correction as follows: Page 3, line 63, claim 4, for the word "on" read "an"; page 4, lines 5 and 6, claim 10, strike out the words "an ice-making container adapted to" and insert instead "the container being shorter than said"; and that the said Letters Patent should be read with these corrections therein that the same may conform to the record of the case in the Patent Office.

Signed and sealed this 22nd day of October, A. D. 1929.

M. J. Moore,
Acting Commissioner of Patents.

(Seal)

20. Refrigerating apparatus including in combination a refrigerating element provided with a freezing chamber and a refrigerated surface exposed to air located above the freezing chamber, a wall in front of the freezing chamber and said surface, the wall having an opening registering with said chamber, an ice-making container adapted to be inserted in the chamber through the opening, a closure for the opening in the wall, means connecting the closure to the container and spacing it from one end thereof, said means being so formed as to permit the drippage of water condensed on said surface between the wall and the container.

JESSE G. KING.

CERTIFICATE OF CORRECTION.

Reissue Patent No. 17,434. Granted September 17, 1929, to

JESSE G. KING.

It is hereby certified that error appears in the printed specification of the above numbered patent requiring correction as follows: Page 3, line 63, claim 4, for the word "on" read "an"; page 4, lines 5 and 6, claim 10, strike out the words "an ice-making container adapted to" and insert instead "the container being shorter than said"; and that the said Letters Patent should be read with these corrections therein that the same may conform to the record of the case in the Patent Office.

Signed and sealed this 22nd day of October, A. D. 1929.

M. J. Moore,
Acting Commissioner of Patents.

(Seal)